United States Patent [19]

Huikari

[11] Patent Number: 5,752,786
[45] Date of Patent: May 19, 1998

[54] METHOD FOR RELINING A BRANCH CONDUIT OF A MAIN CONDUIT

[75] Inventor: Pasi Tapio Huikari, Kymonkoski, Finland

[73] Assignee: Uponor Innovation AB, Fristad, Sweden

[21] Appl. No.: 624,619

[22] PCT Filed: Oct. 11, 1994

[86] PCT No.: PCT/SE94/00953

§ 371 Date: May 28, 1996

§ 102(e) Date: May 28, 1996

[87] PCT Pub. No.: WO95/10727

PCT Pub. Date: Apr. 20, 1995

[30] Foreign Application Priority Data

Oct. 11, 1993 [SE] Sweden .................. 9303316

[51] Int. Cl.⁶ .................. F16L 55/165
[52] U.S. Cl. .................. 405/154; 405/303; 138/97
[58] Field of Search .................. 405/154, 174, 405/175, 177, 184, 303; 138/97

[56] References Cited

U.S. PATENT DOCUMENTS

| | | | |
|---|---|---|---|
| 4,754,781 | 7/1988 | Jan de Putter | 138/97 X |
| 4,818,314 | 4/1989 | Brittain et al. | 138/97 X |
| 4,954,016 | 9/1990 | Storgard | 405/154 X |
| 4,958,959 | 9/1990 | St Onge | 405/184 |
| 5,040,922 | 8/1991 | Himmler | |
| 5,253,956 | 10/1993 | Fisco et al. | 405/154 |
| 5,297,582 | 3/1994 | Kitajima et al. | 405/184 X |
| 5,632,952 | 5/1997 | Mandich | 138/97 X |

FOREIGN PATENT DOCUMENTS

| | | |
|---|---|---|
| 0487179 | 5/1992 | European Pat. Off. |
| 2041147 | 9/1980 | United Kingdom |

Primary Examiner—Tamara L. Graysay
Assistant Examiner—Frederick L. Lagman
Attorney, Agent, or Firm—Merchant Gould Smith Edell Welter and Schmidt

[57] ABSTRACT

The invention relates to a method for relining an underground branch conduit (10) of an underground main conduit (11) by a relining pipe (14) in the form of a radially stiff double-walled pipe with a corrugated outer wall (14A) and a smooth elastic inner wall (14B) being inserted by use of a traction rope (22), a draw shoe (20) and a pressure plate (25). A stop element (27) is provided on the traction rope (22), which can be pressed against the draw shoe by the motion of the traction rope in relation to the draw shoe.

5 Claims, 3 Drawing Sheets

METHOD FOR RELINING A BRANCH CONDUIT OF A MAIN CONDUIT

The invention relates to a method for relining an underground branch conduit of an underground main conduit by a relining pipe being inserted into the branch conduit and brought to tight engagement with the main conduit.

Damaged or leaky pipelines can be relined in several ways but especially preferred are methods in which a relining pipe is inserted into the damaged pipeline. The advantage of these methods is that extensive excavation and digging work can be avoided since the work mainly can be performed from existing manholes. Prolonged interruptions in industrial areas as well as traffic diversions can thereby be avoided.

One method for relining pipeline systems with branch conduits comprises relining first of the main conduit and then of the branch conduit a tight connection then being accomplished between the main conduit and the branch conduit.

According to U.S. Pat. No. 4,029,428 relining of the branch conduit is accomplished after relining of the main conduit, by the relining pipe being pushed into the branch conduit from the upstream end thereof, i.e. the end opposite to the end connected to the main conduit. Then a tight connection is formed between the relined main conduit and the relined branch conduit by introduction of polyurethane foam via the branch conduit, which is allowed to set in the junction area, and a connection passage is cut between the main conduit and the branch conduit from the branch conduit at the junction site.

According to GB-A-2,326,158 relining of the branch conduit is accomplished by a relining pipe being pushed into the branch conduit from the upstream end thereof a sealing element a being provided at the front end of the relining pipe. The sealing element is pushed into the main conduit then to be drawn back into the branch conduit to a sealing position at the junction site thereof. A sealant is then injected between the branch conduit and its relining pipe.

However, these methods involve a practical drawback when the relining of the branch conduit takes place from the upstream end thereof by pushing the relining pipe into the branch conduit since the upstream end seldom has a manhole but often has a covering on a vertical riser. From here it is almost impossible to install relining pipes without destructive measures. Therefore, relining from the upstream end can be difficult to accomplish and furthermore complicates sealing of the junction between the main conduit and branch conduits. Also, high the axial flexibility of the relining pipeis requiredwhen the inner diameter of the main conduit is small;, it may be as small as 170 mm.

Other methods for relining branch conduits, e g according to GB-A-2,213,230, involve the introduction of a relining pipe with a deformed cross section. This requires processing of the pipe in order to deform it before as well as after the insertion thereof so that the pipe can regain its circular cross sectional shape after insertion. According to additional methods a stocking-shaped element is pulled into the pipe, which is hardened after a circular cross sectional shape having been imparted to it, a process which is complicated. Both these methods are very expensive.

According to EP-A1-0,487,179 and GB-A-2,041,147 a flexible hose having a flange is introduced into a branch conduit via a main conduit by means of a rope or the like, the flange being brought into sealing engagement against the inside of the main conduit and the inside of a relining pipe in the main conduit, respectively.

A flexible hose is a cylindrical body which is essentially unable to take up radial compressive forces as well as axial bending forces. Thus, it is not suitable to install a hose in for example a sewer, which is the main application of the present application, considering the forces which must be taken up by the hose, such as earth loads and groundwater pressure. This is particulary true when the conduit in which the relining pipe has been inserted is defect and cracked or has even ruptured into several pieces due to external forces.

EP-A1-0,213,674 discloses a radially stiff (circumferentially stiff) plastic pipe with a corrugated outer wall and an elastomeric smooth inner wall which is flexible enough to be passed through a vertical shaft to an underground pipeline which extends substantially horizontally. This pipe has the radial stiffness which is desired for renewal of an underground pipeline, and it is at the same time flexible enough to be bent in a substantially right angle without being buckled or broken in pieces.

The purpose of the invention is to provide a method of the kind mentioned above, which allows the introduction of a radially stiff but flexible relining pipe into the branch conduit without the relining pipe being subject to excessive tensile strain and it is at the same time gauranteed that the flange is pressed with necessary force against the inside of the relining pipe in the main conduit.

In order to achieve this purpose the method according to the invention has obtained the characterizing features of claim 1.

In order to explain the invention in more detail an illustrative embodiment thereof will be described below reference being made to the accompanying drawings in which FIG. 1 is a fragmentary perspective view of a conventional pipeline system with a main conduit and a branch conduit connected to it, FIG. 2 is an axial cross sectional view of a main conduit with a branch conduit connected to it shown in plan view.

Assuming that the pipeline system, including the main conduit 11 and one or more branch conduits 10, need to be renewed, the connections of the branch conduits with the main conduit are first mapped, which can be made in a known manner, for example by the introduction of a marker through the branch conduit up to the place where it opens into the main conduit. The marker can be detected by a robot which is introduced into the main conduit or by scanning the main conduit by means of a camera introduced into it. The distances to the openings of the branch conduits in the main conduit are then determined from a place on the main conduit where a manhole is available or a shaft has been provided. This measurement is combined with an angle measurement for determination of the angular position of the branch conduit opening in the main conduit. Then, a relining pipe 12 is introduced into the main conduit 11 by means of known techniques. In the present case this relining pipe is assumed to consist of a radially stiff (circumferentially stiff) double-walled pipe of weldable plastic with a smooth inner wall and a corrugated outer wall, the inner wall consisting of an elastomer so that the relining pipe can flex relatively easily. As mentioned above, such a pipe is described in EP-A1-0,213,674. On the basis of the earlier performed measurements holes are then made in the relining pipe 12 by means of a robot which is introduced into the main conduit at the openings of the branch conduits.

In order to renew the branch conduit 10 according to the method of the invention, a drawing element is introduced from the upstream end of the branch conduit in the house and further into the main conduit and through the same up to the manhole or the shaft. This drawing element can consist of a pipe eel which is pushed through the pipelines, or a rope which is flushed or blown through the pipelines. The pipe eel or rope drawn through the pipelines can be used to pull in a traction wire rope. These operations are easily performed through an aperture of a vertical riser without destructive measures.

Figure 1:
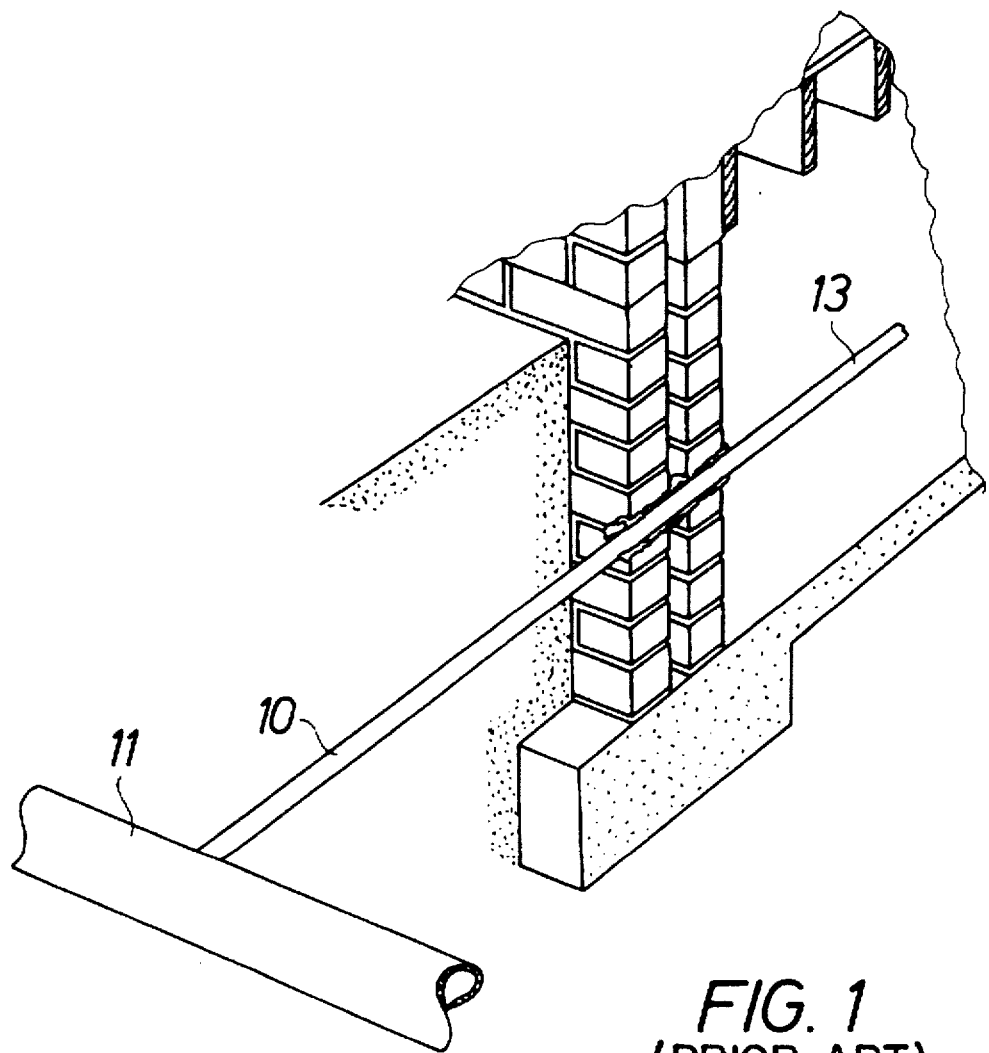
FIG. 1 shows a branch conduit (service pipe) 10 for a house. The conduit is located in the ground outside the house and one end thereof is connected to an underground main conduit 11.
Figure 2:
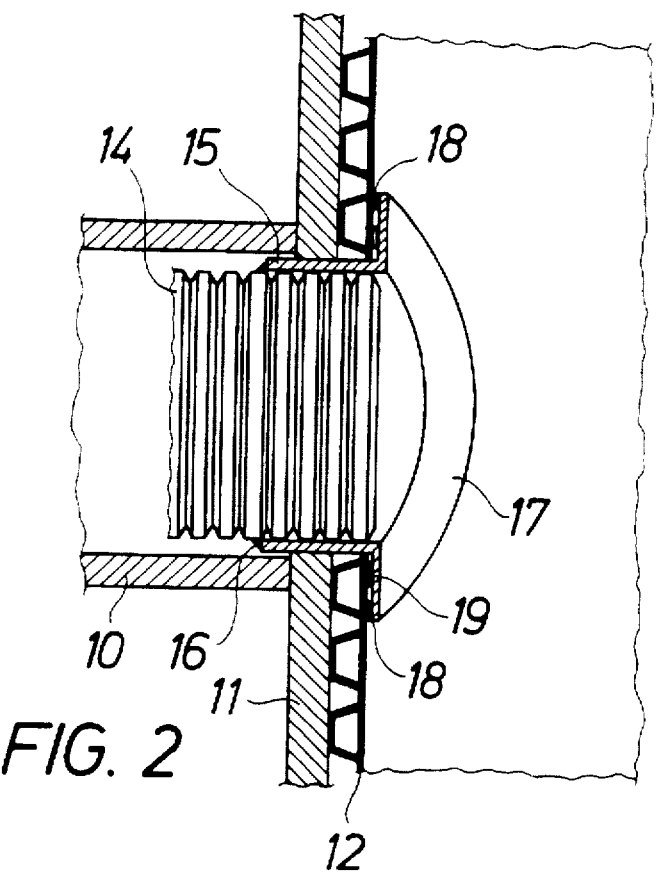
Figure 3:
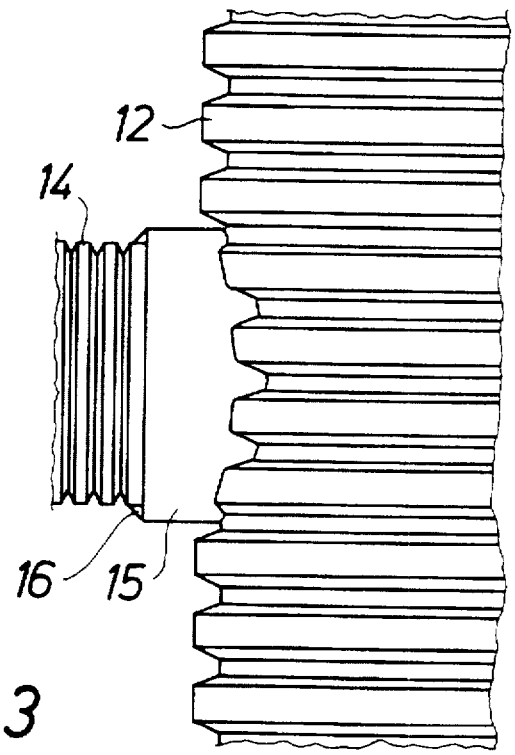
FIG. 3 is a fragmentary plan view of relining pipes for a main conduit and a branch conduit.

A radially stiff (circumferentially stiff) relining pipe 14 of the same nature as the relining pipe 12 but with a diameter adapted to the branch conduit and a length adapted to the length of the branch conduit to be relined is provided at one end thereof with a connecting piece 15 of thermoplastic, FIG. 2 and 3. The connecting piece is pushed over the end of the relining pipe and is welded to the relining pipe at 16. The connecting piece has a flange 17 which is curved according to the inside of the relining pipe 12. A sealant is applied on this flange at 18, and the flange has electric heating wires embedded therein. The flange is furthermore provided with an elastic sealing ring 19. The heating wires can be of the type SWJ (Swedish joint). The relining pipe is at its other end provided with a draw shoe 20 which is attached to the relining pipe by means of bolts 21 and has a semi-spherical dome-like portion 20' protruding from the end of the pipe, as shown in FIG. 4.

Figure 4:
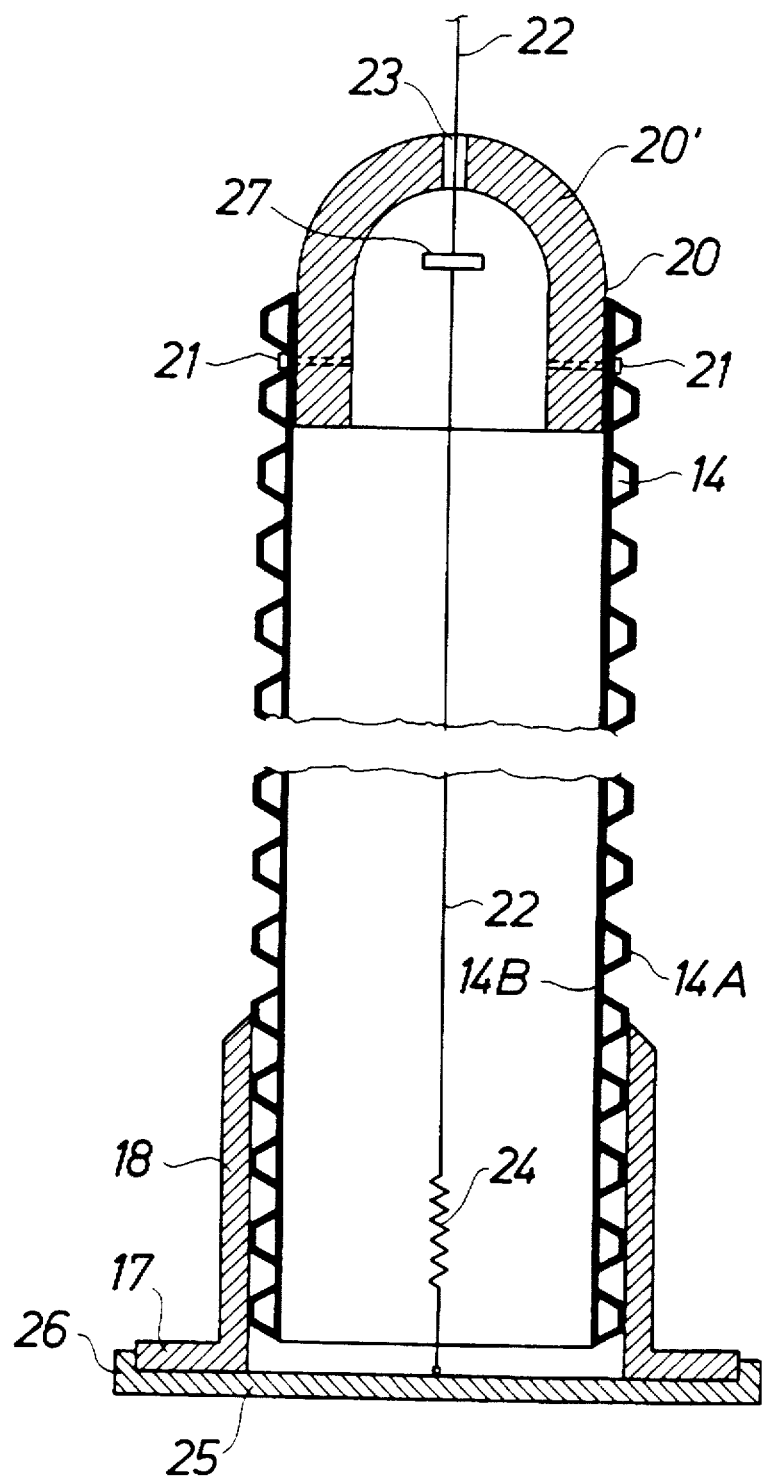
FIG. 4 is an axial cross sectional view of the relining pipe for a branch conduit with a draw shoe, a traction rope and a pressure plate.

The traction wire rope, designated 22 in FIG. 4, inserted into the main and branch conduits, is guided through an aperture 23 in the draw shoe 20 and can pass freely through this aperture. The traction wire rope is pulled through the relining pipe 14 to the other end thereof where it via a spring 24 is secured to a pressure plate 25 which is kept centered on the flange 17 by means of a border 26. The border has a height which is smaller than the thickness of the flange. A stop element 27 is attched to the rope, which cannot pass through the hole 23 but can be applied against the draw shoe when the spring 24 is stretched as the traction wire rope is being pulled.

When pulling the wire rope 22, the introduction of the relining pipe 14 takes place initiallt by the relining pipe being pushed forward under pressure against the flange 17 via the pressure plate 25 in order not to subject the relining pipe to excessive tensile stress and accompanying elongation. When the relining pipe has to pass from the main conduit into the branch conduit at a substantially right angle, an increased resistance to movement of the relining pipe will be exerted with accompanying increase of the pulling force of the traction wire rope. Then difficulties may arise in pushing the relining pipe from the main conduit into the branch conduit. As the tractive force increases, the spring 24 will be stretched and the stop element 27 will be pressed against the draw shoe 20 at the hole 23 as a supplement to the compressive force via the pressure plate, movement into the branch conduit thus being facilitated.

In a further embodiment of the invention the spring is excluded and the function thereof between the traction rope and the draw shoe arises by the inner pipe being axially compressed under the influence of the pulling force in the traction rope when the resistance to the introduction of the inner tube into the branch conduit is increased.

When the relining pipe is in place in the branch conduit with the flange 17 applied against the inside of the relining pipe 12, the flange has to be attached to it.

Electric connection wires (not shown) connected to the heating wires accompany the relining pipe 14 and have such a length that they are accessible from the manhole or the shaft. While keeping the flange 17 pressed against the inside of the relining pipe 12 (the stop element may have been removed previously so that the pulling force in the traction wire rope acts directly on the pressure plate in order to enhance the pressure on the flange), current is allowed to flow through the heating wires 18 so that a layer of the flange melts and attaches to the relining pipe 12. With the flange 17 welded to the relining pipe 12 and with the sealing ring 19 therebetween a tight connection is achieved between the relining pipe 14 of the branch conduit and the relining pipe 12 of the main conduit. The relining pipe is tightly connected to the branch conduit 10 in a known way at the upstream end of the relining pipe. No difficulties arise here since this end of the branch conduit is easily accessible.

Then injection of a setting sealant is made between the relining pipes and the relinded conduits. When the sealant has set, the pressure plate 25 is removed by withdrawing it by means of an attached rope which was drawn into the pipe 12 at the same time as the pipe 14 and is accessible from the manhole or the shaft.

It should be mentioned that even if the main conduit is not provided with a relining pipe, relining of the branch conduit can take place in the way mentioned above. In this case, the tight connection between the main conduit and the relining pipe must take place by injection of sealant since weldings against pipes of cement or concrete cannot be accomplished.

I claim:

1. Method for relining an underground branch conduit (10) of an underground main conduit (11), the method comprising the steps of: introducing into the branch conduit via the main conduit a relining pipe (14) with a substantially circular cross section adapted to the branch conduit, tightly connecting to the main conduit on the inside thereof a flange (17) at one end of the relining pipe, using as a relining pipe a radially stiff double-walled pipe with a corrugated outer wall (14A) and a smooth elastic inner wall (14B), attaching a draw shoe (20) to the other end of the relining pipe (14), introducing a traction rope (22) through the branch conduit (10) into and through the main conduit (11) as well as through the draw shoe and the relining pipe, securing said rope to a pressure plate (25) in said other end of the relining pipe, and providing a stop element (27) on the traction rope (22), which can be applied against the draw shoe by the motion of the traction rope in relation to the draw shoe.

2. Method as claimed in claim 1, further comprising the step of connecting a spring (24) between the pressure plate (25) and the draw shoe (20).

3. Method as claimed in claim 1, further comprising the step of applying a sealant on the flange (17) for tight connection of the relining pipe (14) to the main conduit (11).

4. Method as claimed in claim 1, further comprising the step of welding the flange (17) to the inside of the main conduit (11) by fusing the plastic material thereof by electric heating by means of resistance wires (18) in or on the flange (17).

5. Method as claimed in claim 1, further comprising the step of applying a gasket (19) between the flange (17) and the inside of the main conduit (11).

* * * * *